US012693830B2

(12) United States Patent
Lee et al.

(10) Patent No.: US 12,693,830 B2
(45) Date of Patent: Jul. 28, 2026

(54) COMPUTE-IN-MEMORY LUT-BASED MULTIPLY-ADD APPARATUS

(71) Applicant: Taiwan Semiconductor Manufacturing Company, Ltd., Hsinchu (TW)

(72) Inventors: Chia-Fu Lee, Hsinchu City (TW); Po-Hao Lee, Hsinchu City (TW); Yi-Chun Shih, Taipei (TW); Yu-Der Chih, Hsin-Chu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 1082 days.

(21) Appl. No.: 17/561,034

(22) Filed: Dec. 23, 2021

(65) Prior Publication Data

US 2022/0398067 A1 Dec. 15, 2022

Related U.S. Application Data

(60) Provisional application No. 63/209,207, filed on Jun. 10, 2021.

(51) Int. Cl.
*G06F 7/544* (2006.01)

(52) U.S. Cl.
CPC .................................. *G06F 7/5443* (2013.01)

(58) Field of Classification Search
CPC .... G06F 7/5057; G06F 15/7821; G06F 17/10; G06F 7/5443; G06F 7/5318; G06T 5/60
See application file for complete search history.

(56) References Cited

U.S. PATENT DOCUMENTS

| | | | |
|---|---|---|---|
| 7,747,668 B2 | 6/2010 | Nomura et al. | |
| 11,216,716 B2 | 1/2022 | Liu et al. | |
| 11,237,799 B2 | 2/2022 | Lee | |
| 11,562,218 B2 * | 1/2023 | Ryu ..................... | G06F 7/5443 |
| 11,720,441 B2 | 8/2023 | Lee et al. | |

(Continued)

FOREIGN PATENT DOCUMENTS

| | | |
|---|---|---|
| CN | 101384992 A | 3/2009 |
| CN | 1998012 B | 11/2010 |

(Continued)

OTHER PUBLICATIONS

Y. Chih et al., An 89TOPS/W and 16.3TOPS/mm2 All-Digital SRAM-Based Full-Precision Compute-In Memory Macro in 22nm for Machine-Learning Edge Applications, Feb. 2021. (Year: 2021).*

(Continued)

*Primary Examiner* — James Trujillo
*Assistant Examiner* — Maria De Jesus Rivera
(74) *Attorney, Agent, or Firm* — Merchant & Gould P.C.

(57) ABSTRACT

A multiply-accumulate (MAC) device for compute-in-memory (CIM) includes an input driver configured to provide a plurality of input signals including a first input signal and a second input signal. A lookup table (LUT) stores or accesses a plurality of CIM weight signals including a first CIM weight signal and a second CIM weight signal. The LUT is configured to receive the first input signal and the second input signal and provide a sum output based on the first and second input signals and the first and second CIM weight signals.

20 Claims, 10 Drawing Sheets

(56) References Cited

U.S. PATENT DOCUMENTS

| 2005/0201457 A1* | 9/2005 | Allred ................ H03H 21/0012 |
| | | 375/232 |
| 2019/0138567 A1* | 5/2019 | Martin ..................... G06N 3/04 |
| 2020/0073636 A1 | 3/2020 | Cammarota et al. |
| 2020/0076435 A1 | 3/2020 | Wang |
| 2020/0160161 A1* | 5/2020 | Yoo .......................... G06N 3/04 |
| 2022/0222044 A1* | 7/2022 | Song .................... G06F 7/4876 |

FOREIGN PATENT DOCUMENTS

| CN | 111652359 A | 9/2020 |
| CN | 112567350 A | 3/2021 |
| CN | 112748900 A | 5/2021 |
| CN | 112749794 A | 5/2021 |
| KR | 10-2020-0059153 A | 5/2020 |
| TW | 202036390 A | 10/2020 |
| TW | 202113597 A | 4/2021 |

OTHER PUBLICATIONS

D. Bekiaris et al., A High-Speed Radix-4 Multiplexer-Based Array Multiplier, 2008. (Year: 2008).*
N. Verma et al., "In-Memory Computing," 2019. (Year: 2019).*
Chinese Office Action for Application No. 202210161380.1 mailed Apr. 27, 2026.
San et al., "The Analysis and Simulating for FPGA-Based Multiplier Implementation Structures," Microprocessors, No. 3, pp. 3-7, In Chinese with English Abstract (Jun. 2004).

* cited by examiner

| IN<0> | IN<1> | Sn |
|:-----:|:-----:|:--:|
| 0 | 0 | 0 |
| 0 | 1 | W_Bn |
| 1 | 0 | W_An |
| 1 | 1 | W_An + W_Bn |

| IN<0>+ IN<1> | IN<2>+ IN<3> | (IN<0>+IN<1>)*(IN<2>+IN<3>) | SCn |
|---|---|---|---|
| 0 | 0 | 0 | 0 |
| 0 | 1 | 0 | S_Bn |
| 1 | 0 | 0 | S_An |
| 1 | 1 | 1 | S_An + S_Bn |

FIG. 9

COMPUTE-IN-MEMORY LUT-BASED MULTIPLY-ADD APPARATUS

CROSS-REFERENCE TO RELATED APPLICATIONS

This application claims the benefit of U.S. Provisional Patent Application No. 63/209,207, filed Jun. 10, 2021, entitled, "MULTIPLY-ACCUMULATE DEVICE." The disclosure of this priority application is hereby incorporated by reference in its entirety into the present application.

BACKGROUND

This disclosure relates generally to in-memory computing, or compute-in-memory ("CIM"), and further relates to multiply-accumulate ("MAC") operations for CIM. Compute-in-memory or in-memory computing systems store information in the main random-access memory (RAM) of computers and perform calculations at memory cell level, rather than moving large quantities of data between the main RAM and data store for each computation step. Because stored data is accessed much more quickly when it is stored in RAM, compute-in-memory allows data to be analyzed in real time, enabling faster reporting and decision-making in business and machine learning applications. Efforts are ongoing to improve the performance of compute-in-memory systems.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

FIG. 3 is an example truth table for the LUT shown in FIG. 2 in accordance with some embodiments.

FIG. 9 is an example truth table for a second MAC stage LUT in accordance with some embodiments.

DETAILED DESCRIPTION

Figure 1:
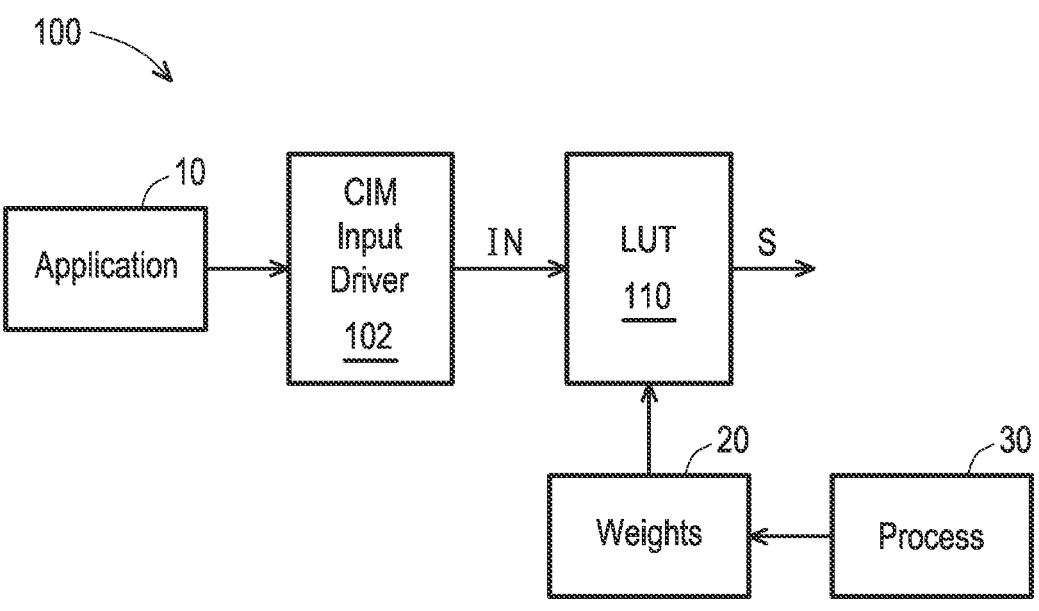
FIG. 1 is a block diagram illustrating an example of a compute-in-memory (CIM) system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

This disclosure relates generally to computing-in-memory ("CIM"). An example of applications of CIM is multiply-accumulate ("MAC") operations. Computer artificial intelligence ("AI") uses deep learning techniques, where a computing system may be organized as a neural network. A neural network refers to a plurality of interconnected processing nodes that enable the analysis of data, for example. Neural networks compute "weights" to perform computation on new input data. Neural networks use multiple layers of computational nodes, where deeper layers perform computations based on results of computations performed by higher layers.

Machine learning (ML) involves computer algorithms that may improve automatically through experience and by the use of data. It is seen as a part of artificial intelligence. Machine learning algorithms build a model based on sample data, known as "training data" in order to make predictions or decisions without being explicitly programmed to do so.

Neural networks may include a plurality of interconnected processing nodes that enable the analysis of data to compare an input to such "trained" data. Trained data refers to computational analysis of properties of known data to develop models to use to compare input data. An example of an application of AI and data training is found in object recognition, where a system analyzes the properties of many (e.g., thousands or more) of images to determine patterns that can be used to perform statistical analysis to identify an input object.

As noted above, neural networks compute weights to perform computation on input data. Neural networks use multiple layers of computational nodes, where deeper layers perform computations based on results of computations performed by higher layers. Machine learning currently relies on the computation of dot-products and absolute difference of vectors, typically computed with MAC operations performed on the parameters, input data and weights. The computation of large and deep neural networks typically involves so many data elements it is not practical to store them in processor cache, and thus they are usually stored in a memory.

Thus, machine learning is very computationally intensive with the computation and comparison of many different data elements. The computation of operations within a processor is orders of magnitude faster than the transfer of data between the processor and main memory resources. Placing all the data closer to the processor in caches is prohibitively expensive for the great majority of practical systems due to the memory sizes needed to store the data. Thus, the transfer of data becomes a major bottleneck for AI computations. As the data sets increase, the time and power/energy a computing system uses for moving data around can end up being multiples of the time and power used to actually perform computations.

CIM circuits thus perform operations locally within a memory without having to send data to a host processor for processing. Since such operations are performed within the memory, the CIM device may output computation results instead of simply outputting raw or unprocessed data. This may reduce the amount of data transferred between memory and the host processor, thus enabling higher throughput and performance. The reduction in data movement also reduces energy consumption of overall data movement within the computing device.

Some CIM devices include a memory array with memory cells arranged in rows and columns. The memory cells are configured to store weight signals, and an input driver provides input signals. A multiply and accumulation (or multiplier-accumulator) circuit performs MAC operations, where each MAC operation computes a product of two numbers and adds the products. For instance, the memory cells, which store CIM weight signals, may be coupled to respective dynamic logic circuits, such as a multiply circuits, which provide an output signal based on the input signal from the input driver and the weight signal stored in the corresponding memory cell. The outputs of the logic circuits are accumulated, or added, using an adder circuit to obtain the system output value. The multiply circuits may be implemented, for example, by NOR or AND logic circuits.

For example, a first input signal may be multiplied by each bit of a first weight signal resulting in a first group of products, while a second input signal may be multiplied by each bit of a second weight signal resulting in a second group of products. Thus, for four bit weights, the first and second groups of products are also each four bit signals that are provided to an adder circuit to accumulate the first and second groups of products resulting from the input signals and the weight signals. Of course, many CIM weight signals and corresponding input signals are processed for CIM operations, and the mass MAC operations associated therewith may generate a significant peak/average current. Further, implementing the desired CIM processing speeds may result in a high MAC operation trigger rate. As the trigger rate increases, the current consumption of the dynamic logic circuits (i.e. multiply circuits) and adder circuits also increases.

Some disclosed embodiments are configured to replace the dynamic multiplier and adder circuits with static lookup table (LUT) circuits to reduce peak/average current. In some examples, for 100% toggle rate, the MAC operation can be reduced 41% with some disclosed embodiments.

FIG. 1 is a block diagram illustrating an example of an MAC device 100 for a CIM system in accordance with disclosed embodiments. The MAC device 100 includes an input driver 102 that selectively provides input signals. The input signals may be determined based on one or more types of applications 10, such as applications associated with neural networks and machine learning. An LUT 110 stores or accesses a plurality of CIM weight signals. The CIM weight signals 20 may be determined according to one or more processes 30 such as a training result or a configuration of a user, for example. The LUT 110 has input terminals connected to receive input signals IN from the input driver 102, and output terminals that provide a plurality of sum outputs S based on the input signals and the CIM weight signals.

Figure 2:
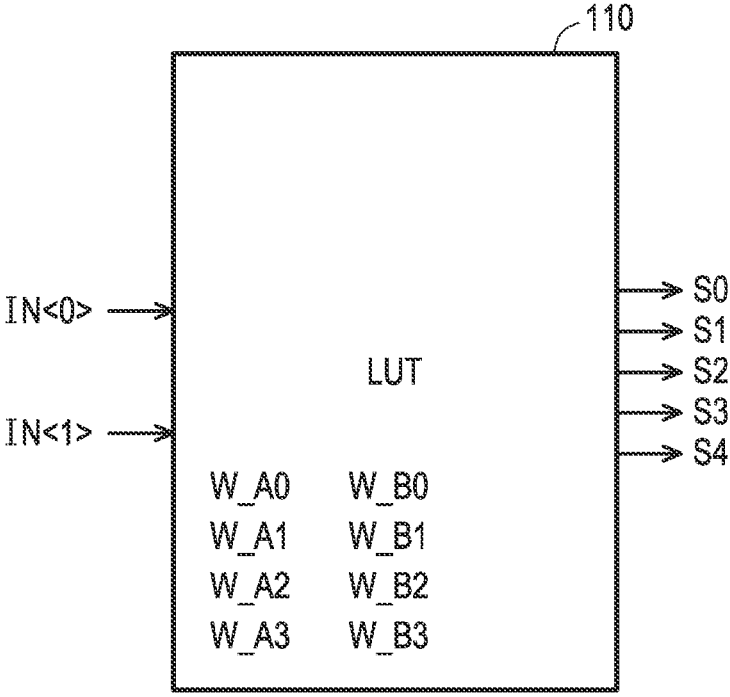
FIG. 2 is a block diagram illustrating an example of a lookup table (LUT) in accordance with some embodiments.

In accordance with aspects of the disclosure, the example MAC device 100 may include a plurality of the LUT circuits 110. Each of the LUT circuits are configured for first stage MAC operations of the CIM MAC operation. FIG. 2 illustrates an example of the LUT 110. Some examples of the LUT 110 circuit store or access four bit weight signals and are configured to receive one bit input signals IN, though weight signals and input signals having more or fewer bits are within the scope of the disclosure. In the example shown in FIG. 2, the LUT circuit 110 stores a first group of weights W_An (n=0, 1, 2, 3), and a second group of weights W_Bn, and receives first and second input signals IN<0> and IN<1>. The first LUT circuit outputs different MAC operating results Sn of the first group of weights W_An and the second group of weights W_Bn based on the input signals IN<0> and IN<1>. In the illustrated example, the LUT 110 provides a five output signals S0, S1, S2, S3, S4, where the S4 output is a sign extension bit which is discussed further below.

For example, the first input signal IN<0> may correspond to the first group of weights W_An, while the second input signal IN<1> may correspond to the second group of weights W_Bn. Predetermined sum outputs Sn may then be selected based on the received first and second input signals and the respective first and second groups of weights.

As noted above, the logic operation performed on the inputs and CIM weights may comprise a multiply operation. Thus, if the input signal is at a low logic level (0), the result of the multiply operation will also be 0 regardless of the values of the weight signals. Moreover, if both the first input signal IN<0> and the second input signal IN<1> are 0, the sum of the corresponding multiply operations will also be zero. If the input signal is at a high logic level (1), the result of the multiply operation will be the value of the weight signals. Hence, if either the first input signal IN<0> or the second input signal IN<1> (but not both) is 1, the sum of the corresponding multiply operations will be the value of the weight signal corresponding to the input signal that is 1. Still further, if both the first input signal IN<0> and the second input signal IN<1> are at logic 1, the sum of the corresponding multiply operations will be the sum of the first and second groups of weights. This may be summarized as follows.

IN<0>=IN<1>=0, Sn=0
IN<0>=0 and IN<1>=1, Sn=W_Bn
IN<0>=1 and IN<1>=0, Sn=W_An
IN<0>=IN<1>=1, Sn=(W_An+W_Bn)

A truth table reflecting these relationships and illustrating the sum outputs Sn based on the inputs and weight signals is shown in FIG. 3. Since the LUT 110 is configured to output the predetermined sum signals Sn based on the first input signal IN<0> and the first group of weights W_An, and the second input signal IN<1> and the second group of weights W_Bn, it is not necessary to perform some dynamic MAC logic operations. This reduces overall power consumption. In some examples, the LUT 110 may be implemented in software executed by a suitable processing device. Example processing devices include, but are not limited to, a microprocessor, a digital signal processor, an application-specific integrated circuit, and a field programmable gate array.

Figure 4:
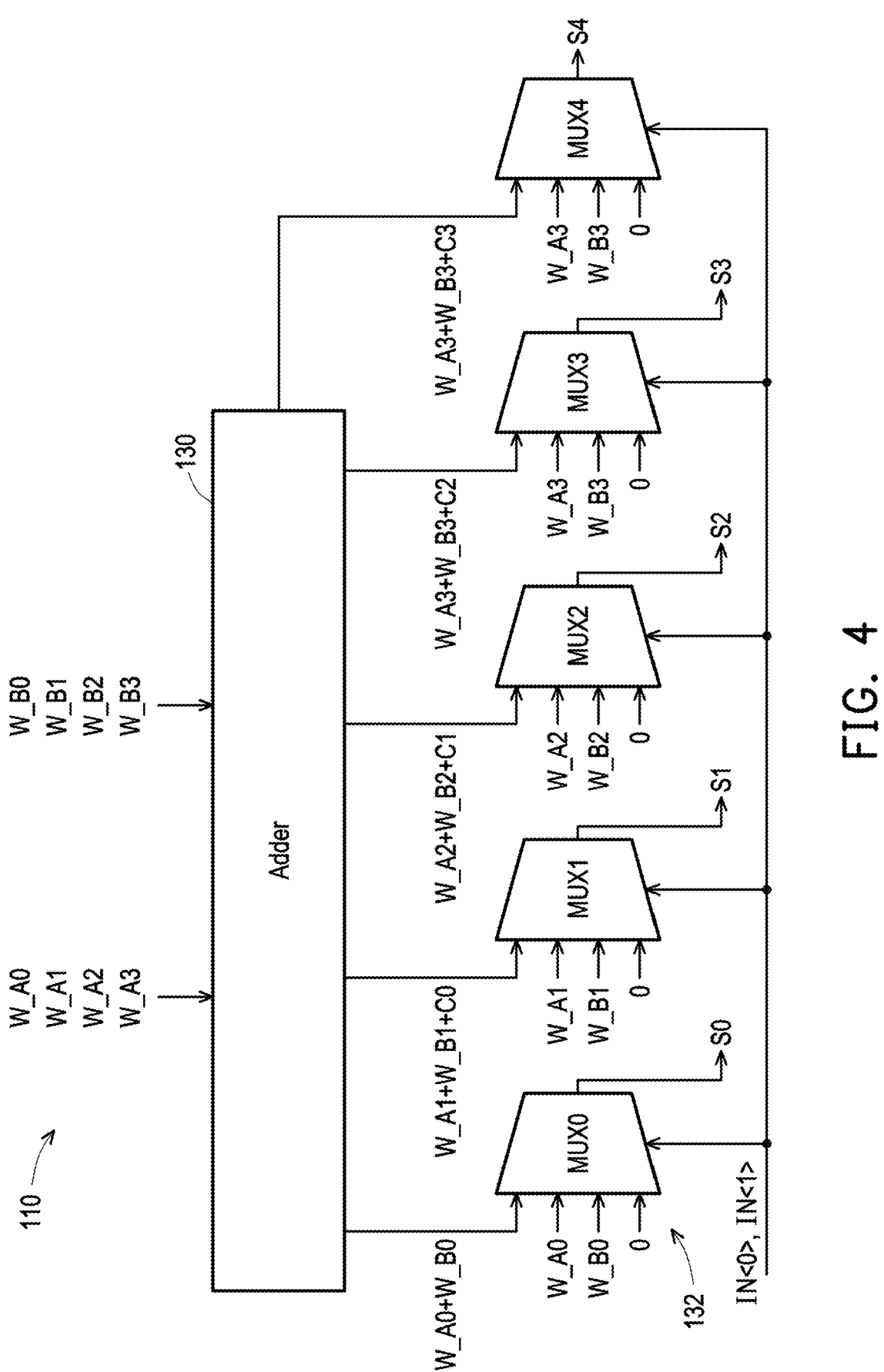
FIG. 4 is a schematic diagram illustrating an example LUT circuit in accordance with some embodiments.

FIG. 4 illustrates an example embodiment of the LUT 110. In the example shown in FIG. 4, the LUT 110 includes an adder 130 and a plurality of multiplexers (MUX) 132 including MUX0, MUX1, MUX2, MUX3, and MUX4. As discussed above in conjunction with the truth table shown in FIG. 3, if both the first input signal IN<0> and the second input signal IN<1> are logic 1, the LUT 110 outputs the sum of the weight signals for the first group of weights W_An and the second group of weights W_Bn. The LUT 110 shown in the example of FIG. 4 includes the adder 130 for this purpose. In some examples, the adder 130 shown in FIG. 4 may be implemented in software executed by a suitable processing device. Example processing devices include, but are not limited to, a microprocessor, a digital signal processor, an application-specific integrated circuit, and a field programmable gate array.

The adder 130 receives the weight signals of the first group of weights W_An and the second group of weights W_Bn, and is configured to add the corresponding weight signals of the first group of weights W_An and the second group of weights W_Bn. In some examples, the weight signals of the first group of weights W_An and the second group of weights W_Bn are stored in any suitable memory, such a latch, or flip-flop, or other memory circuit such as flash memory, magnetic random access memory (MRAM), resistive random access memory (RRAM), static random access memory (SRAM), etc.

In the example shown in FIG. 4, the weight signals of the first group of weights W_An and the second group of weights W_Bn comprise the four bit weight signals of the first group of weights W_An and the second group of weights W_Bn from the least significant bit 0 to the most significant bit 3. Other embodiments may receive other than four bit weight signals.

The adder 130 is thus configured to add the first bits of the first and second weight groups W_A0 and W_B0, and output the resulting sum to the first mux MUX0. MUX0 further receives the first bit W_A0 of the first weight group, the first bit of the second weight group W_B0, and 0 as inputs.

The adder 130 is further configured to add the second bits of the first and second weight groups W_A1 and W_B1 as well as a first carry bit C0 resulting from the add operation of the first bits of the first and second weight groups W_A0 and W_B0. The sum of W_A1+W_B1+C0 is output to MUX1, which further receives the second bit W_A1 of the first weight group, the second bit of the second weight group W_B1, and 0 as inputs.

Similarly, the adder 130 adds the third bits of the first and second weight groups W_A2 and W_B2 and the second carry bit C1 resulting from the add operation of the second bits of the first and second weight groups W_A1 and W_B1, and the sum of W_A2+W_B2+C1 is output to MUX2, which further receives the third bit W_A2 of the first weight group, the third bit of the second weight group W_B2, and 0 as inputs.

The adder 130 further adds the fourth bits of the first and second weight groups W_A3 and W_B3 and the third carry bit C2 resulting from the add operation of the third bits of the first and second weight groups W_A2 and W_B2, and the sum of W_A3+W_B3+C2 is output to MUX3, which further receives the fourth bit W_A3 of the first weight group, the fourth bit of the second weight group W_B3, and 0 as inputs.

The adder 130 also adds the fourth bits of the first and second weight groups W_A3 and W_B3 and a fourth carry bit C3 resulting from the add operation of the fourth bits of the first and second weight groups W_A3 and W_B3, and the sum of W_A3+W_B3+C3 is output to MUX4, which further receives the fourth bit W_A3 of the first weight group, the fourth bit of the second weight group W_B3, and 0 as inputs.

The LUT 110 has input terminals that receive the first input signal IN<0> and the second input signal IN<1>. The input terminals are connected to selection terminals of each of MUX0, MUX1, MUX2, MUX3 and MUX4. In response to the first input signal IN<0> and the second input signal IN<1>, each of the MUXs MUX0, MUX1, MUX2, MUX3 and MUX4 provides a respective sum output S0, S1, S2, S3 and S4 (collectively sum outputs S) at its output terminal in accordance with the truth table shown in FIG. 3. In other words, if both the first input signal IN<0> and the second input signal IN<1> are 0, the corresponding MUX 132 outputs a predetermined value or signal such as 0 at its sum output S. If either the first input signal IN<0> or the second input signal IN<1> (but not both) is 1, the corresponding MUX 132 outputs the weight signal corresponding to the input signal that is 1 (i.e W_An if the first input signal IN<0> is 1, or W_Bn if the second input signal IN<1> is 1) at its sum output S. Still further, if both the first input signal IN<0> and the second input signal IN<1> are at logic 1, the corresponding MUX 132 outputs the sum of respective weight signals the corresponding multiply operations will be the sum of the first and second groups of weights W_An, W_Bn at its sum output S. The S4 output of MUX4 provides the sign extension for the sum output.

Thus, the add operation executed by the adder 130 is only used in the case where both the first input signal IN<0> and the second input signal IN<1> are at logic 1. In the other cases (i.e. at least one of the first input signal IN<0> or the second input signal IN<1> is 0), a static input (MUX inputs W_An, W_Bn or 0) is selected for output by the respective MUX 132. Further, since the LUT determines outputs in accordance with, for example, the truth table shown in FIG. 3, dynamic multiply circuits are not required in some examples.

Figure 5:
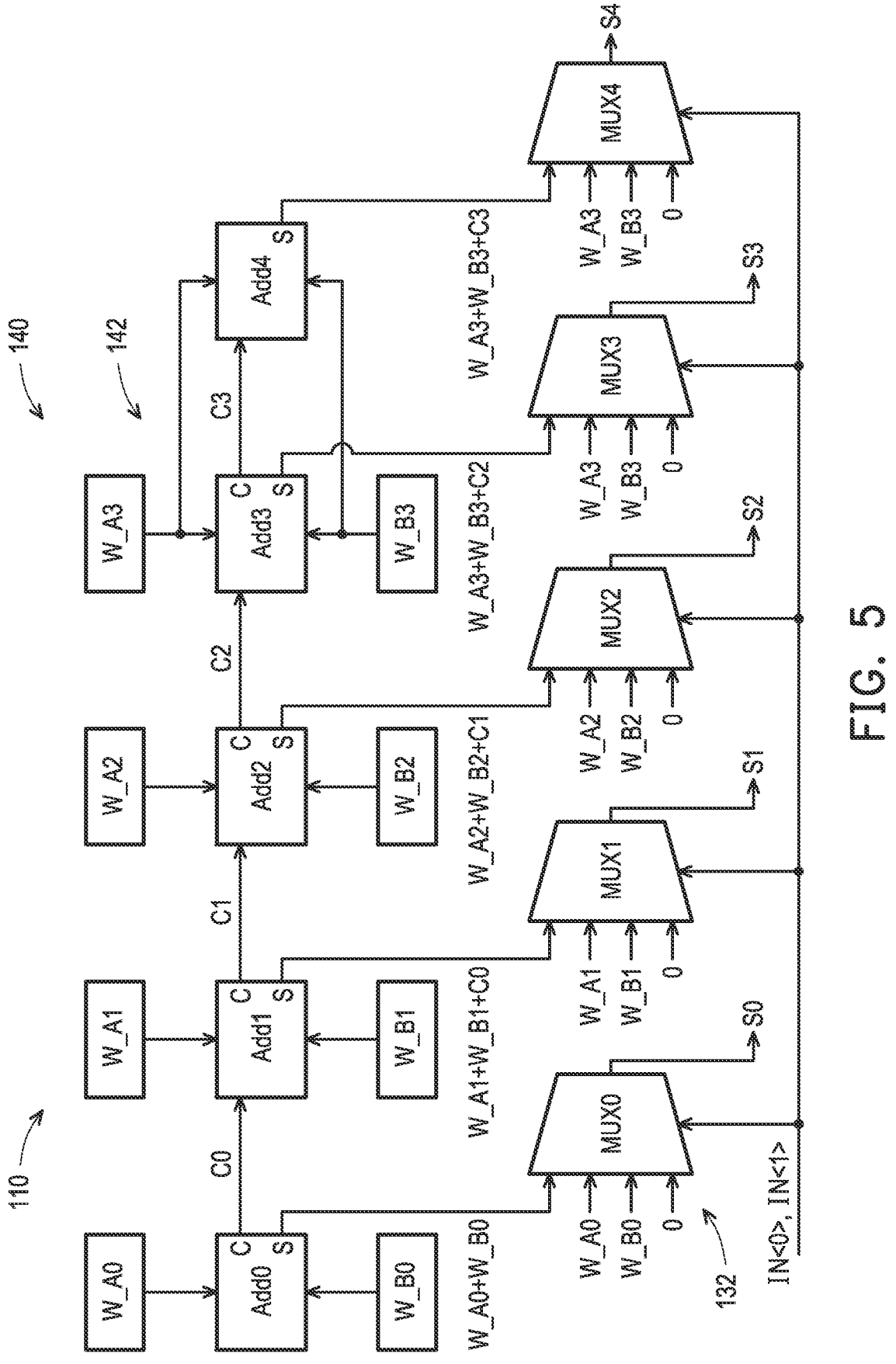
FIG. 5 is a schematic diagram illustrating another example LUT circuit in accordance with some embodiments.

FIG. 5 illustrates further aspects of an embodiment of the LUT 110, in which an adder circuit 140 includes a plurality of adder circuits 142. More specifically, the adder circuit 140 shown in the example of FIG. 5 is a five bit adder that includes five adder circuits Add0, Add1, Add2, Add3, and Add4 (collectively adders or adder circuits 142). In the illustrated embodiment, the first adder Add0 is a half adder circuit, while the remaining adders Add1, Add2, Add3, and Add4 are full adder circuits.

In the example shown in FIG. 5, the weight signals of the first group of weights W_An and the second group of weights W_Bn comprise the four bit weight signals of the first group of weights W_An and the second group of weights W_Bn from the least significant bit 0 to the most significant bit 3. Other embodiments may receive other than four bit weight signals. The adder circuits Add0, Add1, Add2, Add3, respectively receive the corresponding bits of the weight signals of the first group of weights W_An and the second group of weights W_Bn, and are configured to add the corresponding weight signals of the first group of weights W_An and the second group of weights W_Bn. As will be discussed further below, the full adder circuit Add4 also receives the fourth bit of the weight signals W_A3 and W_B3.

The half adder circuit Add0 receives the respective first bits of the first and second weight groups W_A0 and W_B0, and is configured to add the first bits of the first and second weight groups W_A0 and W_B0 and output the resulting sum W_A0+W_B0 to the first mux MUX0. The half adder circuit Add0 additionally outputs a first carry bit C0 based on the add operation of W_A0+W_B0. MUX0 further receives the first bit W_A0 of the first weight group, the first bit of the second weight group W_B0, and 0 as inputs.

The five bit adder circuit 140 further includes the four full adder circuits Add1, Add2, Add 3 and Add 4. The full adder circuit Add1 is configured to add the second bits of the first and second weight groups W_A1 and W_B1 as well as the first carry bit C0 output by the half adder Add0. The first full adder Add1 outputs the sum of W_A1+W_B1+C0 along with a second carry bit C1. MUX1 receives the sum of W_A1+W_B1+C0, as well as the second bit W_A1 of the first weight group, the second bit of the second weight group W_B1, and 0 as inputs.

The second full adder Add2 adds the third bits of the first and second weight groups W_A2 and W_B2 and the second carry bit C1 output by the first full adder Add1. The second full adder Add2 outputs the sum of W_A2+W_B2+C1 along with a third carry bit C2. MUX2 receives the sum of W_A2+W_B2+C1, as well as the third bit W_A2 of the first weight group, the third bit of the second weight group W_B2, and 0 as inputs.

The third full adder Add3 adds the fourth bits of the first and second weight groups W_A3 and W_B3 and the third carry bit C2 output by the second full adder Add2. The third full adder Add3 outputs the sum of W_A3+W_B3+C2 along with a fourth carry bit C3. MUX3 receives the sum of W_A3+W_B3+C2, as well as the fourth bit W_A3 of the first weight group, the fourth bit of the second weight group W_B3, and 0 as inputs.

The fourth full adder Add4 adds the fourth bits of the first and second weight groups W_A3 and W_B3 and the fourth carry bit C3 output by the third full adder Add3. The fourth full adder Add4 outputs the sum of W_A3+W_B3+C3, and MUX4 receives the sum of W_A3+W_B3+C3, as well as the fourth bit W_A3 of the first weight group, the fourth bit of the second weight group W_B3, and 0 as inputs. The five bit adder 140 shown in FIG. 5 is a two's complement adder circuit that facilitates addition of negative weight values in embodiments that employ signed weight inputs. The S4 output of MUX4 provides the sign extension for the sum output.

The example of the LUT circuit 110 shown in FIG. 5 has input terminals that receive the first input signal IN<0> and the second input signal IN<1>. The input terminals are connected to selection terminals of each of MUX0, MUX1, MUX2, MUX3 and MUX4, each of which provide respective sum outputs S0, S1, S2, S3 and S4 (collectively sum outputs S) at its output terminal in accordance with the truth table shown in FIG. 3. In other words, if both the first input signal IN<0> and the second input signal IN<1> are 0, the corresponding MUX 132 outputs 0 at its sum output S. If either the first input signal IN<0> or the second input signal IN<1> (but not both) is 1, the corresponding MUX 132 outputs the weight signal corresponding to the input signal that is 1 (i.e W_An if the first input signal IN<0> is 1, or W_Bn if the second input signal IN<1> is 1) at its sum output S. Still further, if both the first input signal IN<0> and the second input signal IN<1> are at logic 1, the corresponding MUX 132 outputs the sum of respective weight signals the corresponding multiply operations will be the sum of the first and second groups of weights W_An, W_Bn at its sum output S. The S4 output of MUX4 provides the sign extension for the sum output.

Figure 6:
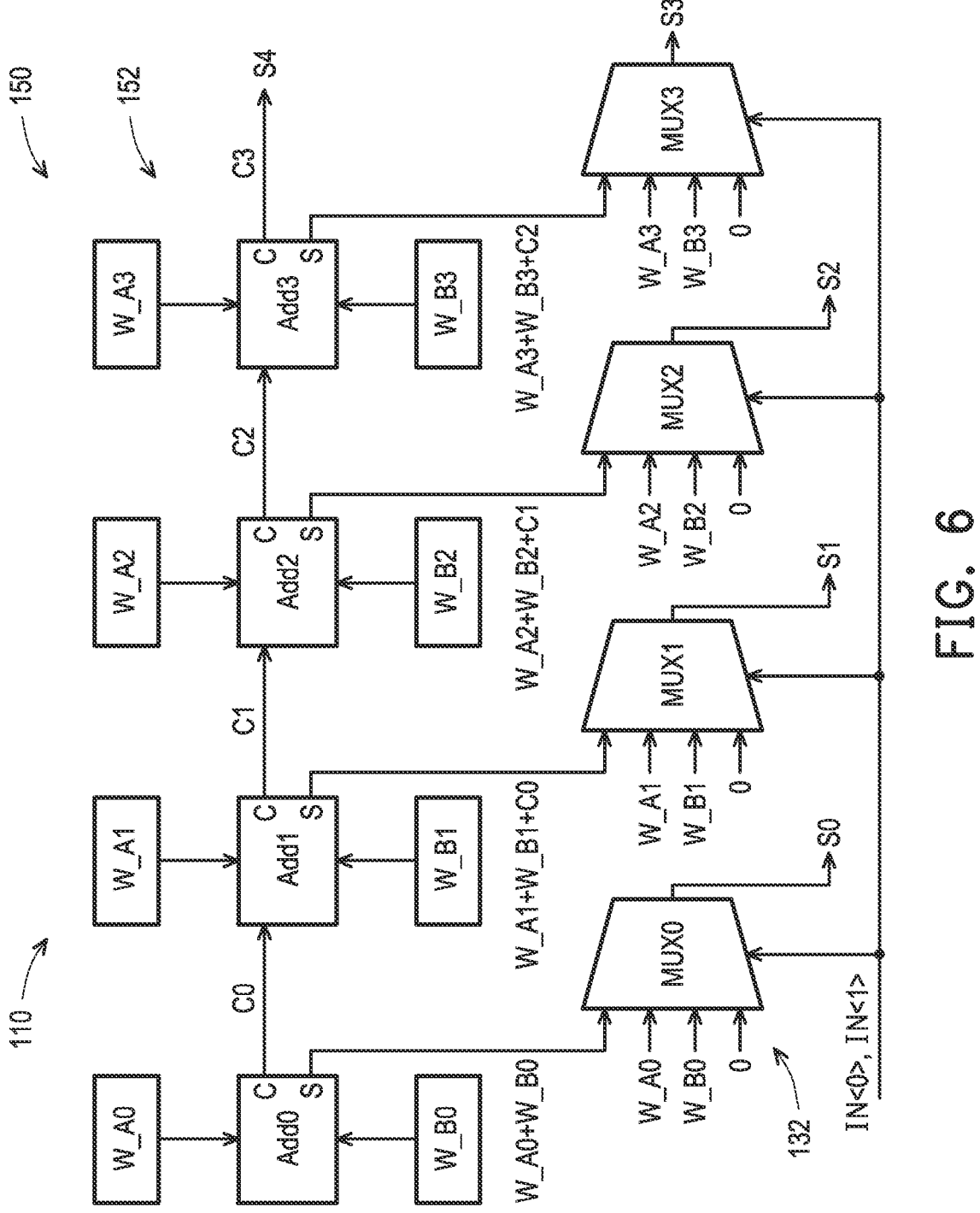
FIG. 6 is a schematic diagram illustrating another example LUT circuit in accordance with some embodiments.

In embodiments where only unsigned weights are stored, the four bit weight values W_An and W_Bn can be added using a four bit binary adder 150 as shown in FIG. 6. Other embodiments may receive other than four bit weight signals. The four bit binary adder 150 includes a plurality of adder circuits 152, including a half adder circuit adder Add0 and three full adder circuits Add1, Add2, Add3. The adder circuits 152 respectively receive the corresponding bits of the weight signals of the first group of weights W_An and the second group of weights W_Bn, and are configured to add the corresponding weight signals of the first group of weights W_An and the second group of weights W_Bn. In the example shown in FIG. 6, the weight signals of the first group of weights W_An and the second group of weights W_Bn comprise the four bit weight signals of the first group of weights W_An and the second group of weights W_Bn from the least significant bit 0 to the most significant bit 3.

The half adder circuit Add0 receives the respective first bits of the first and second weight groups W_A0 and W_B0, and is configured to add the first bits of the first and second weight groups W_A0 and W_B0 and output the resulting sum W_A0+W_B0 to the first mux MUX0. The half adder circuit Add0 additionally outputs a first carry bit C0 based on the add operation of W_A0+W_B0. MUX0 further receives the first bit W_A0 of the first weight group, the first bit of the second weight group W_B0, and 0 as inputs.

The four bit binary adder circuit 150 further includes the three full adder circuits Add1, Add2, and Add3. The full adder circuit Add1 is configured to add the second bits of the first and second weight groups W_A1 and W_B1 as well as the first carry bit C0 output by the half adder Add0. The first full adder Add1 outputs the sum of W_A1+W_B1+C0 along with a second carry bit C1. MUX1 receives the sum of W_A1+W_B1+C0, as well as the second bit W_A1 of the first weight group, the second bit of the second weight group W_B1, and 0 as inputs.

The second full adder Add2 adds the third bits of the first and second weight groups W_A2 and W_B2 and the second carry bit C1 output by the first full adder Add1. The second full adder Add2 outputs the sum of W_A2+W_B2+C1 along with a third carry bit C2. MUX2 receives the sum of W_A2+W_B2+C1, as well as the third bit W_A2 of the first weight group, the third bit of the second weight group W_B2, and 0 as inputs.

The third full adder Add3 adds the fourth bits of the first and second weight groups W_A3 and W_B3 and the third carry bit C2 output by the second full adder Add2. The third full adder Add3 outputs the sum of W_A3+W_B3+C2 along with a fourth carry bit C3, which is the fourth output bit S4 of the adder circuit 150. MUX3 receives the sum of W_A3+W_B3+C2, as well as the fourth bit W_A3 of the first weight group, the fourth bit of the second weight group W_B3, and 0 as inputs.

The example of the LUT circuit 110 shown in FIG. 6 has input terminals that receive the first input signal IN<0> and the second input signal IN<1>. The input terminals are connected to selection terminals of each of MUX0, MUX1, MUX2, and MUX3, each of which provide respective sum outputs S0, S1, S2, S3 at its output terminal in accordance with the truth table shown in FIG. 3. In other words, if both the first input signal IN<0> and the second input signal IN<1> are 0, the corresponding MUX 132 outputs 0 at its sum output S. If either the first input signal IN<0> or the second input signal IN<1> (but not both) is 1, the corresponding MUX 132 outputs the weight signal corresponding to the input signal that is 1 (i.e W_An if the first input signal IN<0> is 1, or W_Bn if the second input signal IN<1> is 1) at its sum output S. Still further, if both the first input signal IN<0> and the second input signal IN<1> are at logic 1, the corresponding MUX 132 outputs the sum of respective weight signals the corresponding multiply operations will be the sum of the first and second groups of weights W_An, W_Bn at its sum output S. The fourth sum output bit S4 is output by the third full adder Add3 at its carry output.

The examples of the LUT 110 discussed above are configured to provide sum outputs Sn based the based on two one-bit input signals (i.e. the first input signal IN<0> and the second input signal IN<1>) and two respective groups of CIM weight signals (i.e. the first group of weights W_An and the second group of weights W_Bn). In CIM implementations, many more input signals and corresponding groups of weight signals are employed. For example, some embodiments receive 256 input signals IN, and a plurality of the LUTs 110 each receive respective pairs of the input signals and provide sum outputs based on the received input signals and corresponding groups of weight signals.

Figure 7:
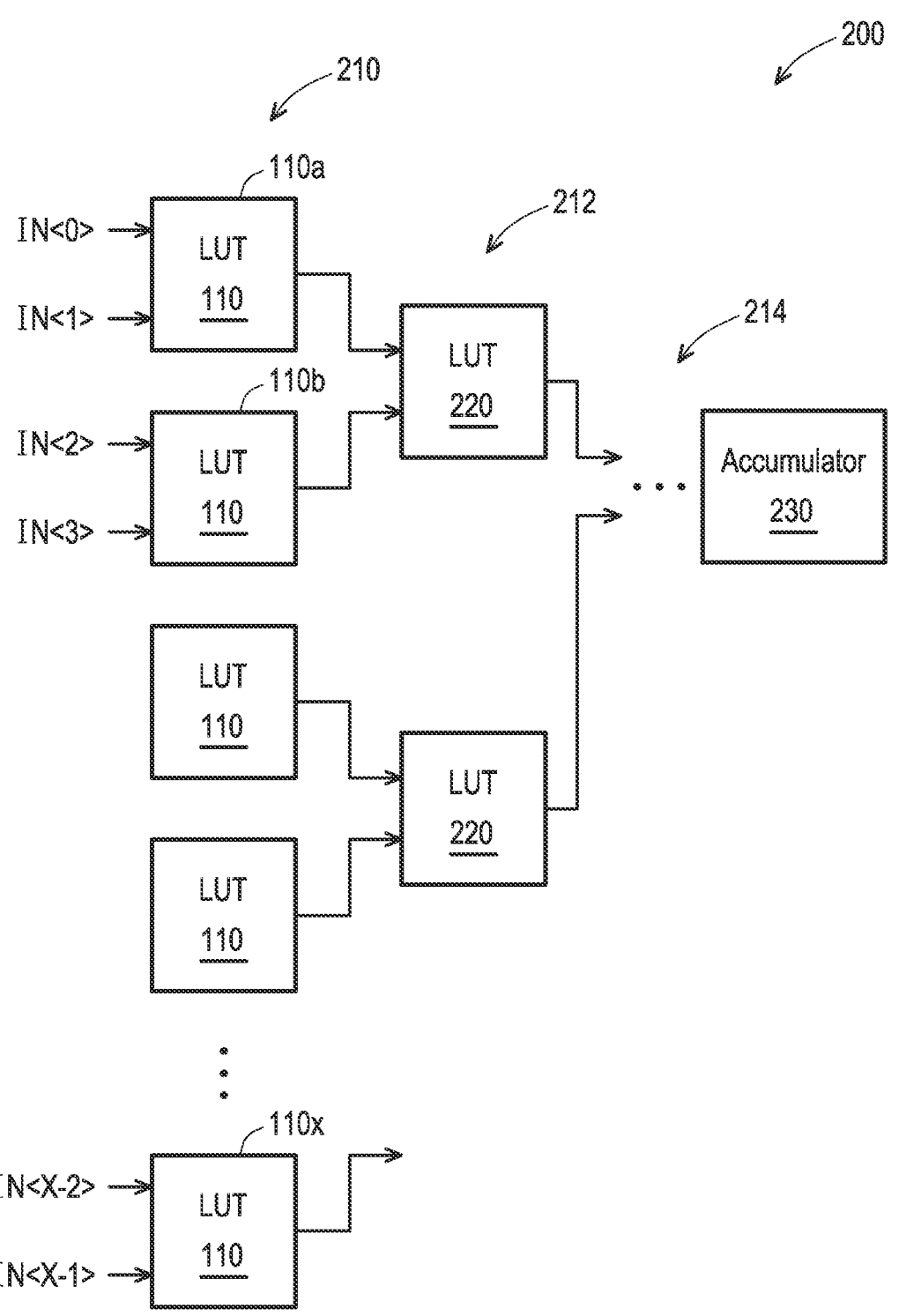
FIG. 7 is a block diagram illustrating an example of first and second multiply-accumulate (MAC) stages for CIM in accordance with some embodiments.

FIG. 7 illustrates aspects of a MAC system 200 for a CIM application. The MAC system 200 includes a first MAC stage 210 with a plurality of the LUTs 110 disclosed above, each of which receive two input signals IN. In the example of FIG. 7, the LUTs 110 in the first MAC stage 210 may sometimes be referred to first MAC stage LUTs 110 herein.

The MAC system 200 receives X input signals (X is a positive integer), with each of the first LUTs 110 receiving a pair of the input signals IN. For example, the uppermost first MAC stage LUT 110a in FIG. 7 receives the first input signal IN<0> and the second input signal IN<1>, the next first LUT 110b receives a third input signal IN<2> and a fourth input signal IN<3>, and so on until the bottommost LUT 110x receives the last input signals IN<X-2> and IN<X-1>. In some embodiments, the MAC system 200 receives 256 input signals IN (X=256).

As described above, each of the first LUTs 110 stores or accesses the first group of CIM weight signals W_An and the second group of weight signals W_Bn. The LUTs 110 have input terminals that receive respective pairs of input signals IN, and the LUTs have output terminals that provide sum outputs Sn based on the received input signals IN and the first group of weight signals W_An and the second group of weight signals W_Bn. As also noted above, the LUTs 110 provide these outputs in accordance with the truth table shown in FIG. 3, where if both receive input signals IN are 0, the first LUTs 110 output a sum output Sn of 0, if either of the received input signals (but not both) is 1, the first LUTs 110 output the value of the weight signal W_An or W_Bn that corresponds to the input signal that is 1, and if both of the received input signals are 1, first LUTs 110 output the sum of the first and second weight signals W_An+W_Bn. As such, the output of the LUT 110 adder circuit, such as the example adder circuits 140 and 150 shown in FIGS. 5 and 6, respectively, is output by the respective MUX 132 when both received input signals are 1. If one or more of the received input signals IN is 0, then a static input (i.e. W_An, W_Bn or 0) is output by the MUX 132. Thus, a logic circuit (i.e. multiply) is not employed and the dynamic adder circuit 140,150 is used only in the state described above to reduce power consumption.

Figure 8:
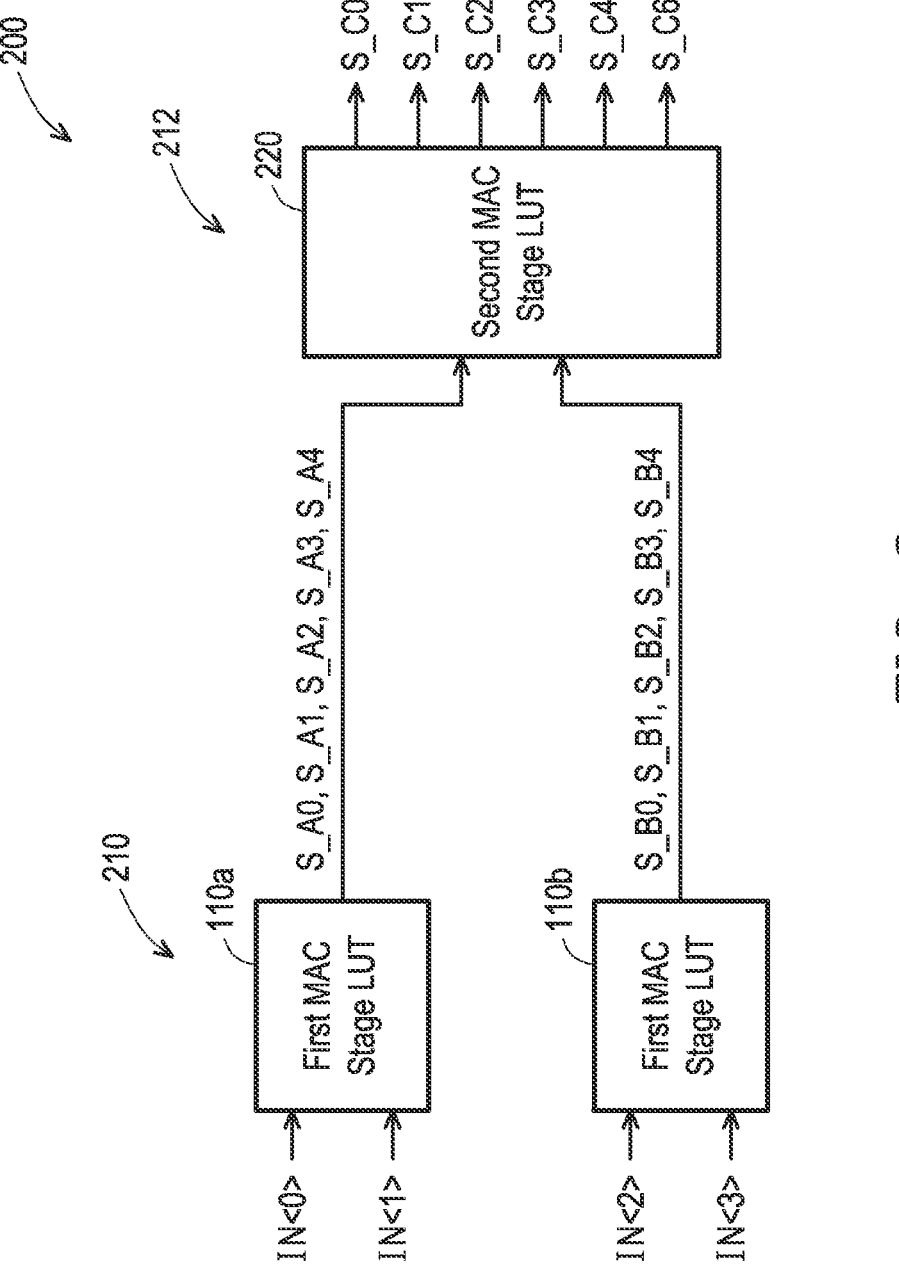
FIG. 8 is a block diagram illustrating examples of LUTs for the first and second MAC stages shown in FIG. 7 in accordance with some embodiments.

FIG. 8 illustrates an example of a first first MAC stage LUT 110a and a second first MAC stage LUT 110b having their sum outputs Sn connected to inputs of a second MAC stage LUT 220. As discussed above, the first MAC stage LUTs 110 provide five bit sum outputs S0, S1, S2, S3, S4. In FIG. 8, the sum outputs Sn for the first MAC stage first LUT 110a are designated S_A0, S_A1, S_A2, S_A3, S_A4 (collectively S_An). Similarly, the sum outputs Sn for the first MAC stage second LUT 110b are designated S_B0, S_B1, S_B2, S_B3, S_B4 (collectively S_An). The second MAC stage LUT 220 is configured to output sum outputs S_C0, S_C1, S_C2, S_C3, S_C4 and S_C5 (collectively S_Cn) based on the input signals IN received by the first and first MAC stage second LUTs 110a, 110b and the sum outputs S_An and S_Bn output thereby.

The LUTs 220 of the second MAC stage 212 are configured to add the sum outputs received from the first MAC stage LUTs 110. However, to further reduce power consumption, the second MAC stage LUTs 220 are configured to select outputs based on the received input signals IN and sum outputs S_An and S_Bn using at least some static stored data signals rather than outputs of dynamic logic circuits. FIG. 9 illustrates an example truth table showing sum outputs S_Cn of the second MAC stage LUTs 220 corresponding to various values of the received input signals IN.

As shown in FIG. 9, in either of the sum of the input signals (IN<0>+IN<1>) or (IN<2>+IN<3>) is 0, a static data value is output as the sum output S_Cn. More specifically, if IN<0>+IN<1>) and (IN<2>+IN<3>) are both 0, then a predetermined data value such as a logic 0 is output. If one of (but not both) IN<0>+IN<1>) or (IN<2>+IN<3>) is 0, then the output of one of the first MAC stage LUTs 110 is output. For instance, if the sum of the first and second inputs received by the first MAC stage first LUT 110a (IN<0>+IN<1>) is 1 and the sum of the third and fourth inputs received by the first MAC stage second LUT 110b (IN<2>+IN<3>) is 0, the sum output S_An of the first MAC stage first LUT 110a is output by the second MAC stage LUT 220. If the sum of the third and fourth inputs received by the first MAC stage second LUT 110b (IN<2>+IN<3>) is 1 and the sum of the first and second inputs received by the first MAC stage first LUT 110a (IN<0>+IN<1>) is 0, the sum output S_Bn of the first MAC stage second LUT 110a is output by the second MAC stage LUT 220.

However, if the sum of the first and second inputs received by the first MAC stage first LUT 110a (IN<0>+IN<1>) is 1 and the sum of the third and fourth inputs received by the first MAC stage second LUT 110b (IN<2>+IN<3>) is also 1, the sum of the sum outputs of the first and first MAC stage second LUTs 110a, 110b (S_Bn+S_Bn)(S−An+S_Bn) is output by the second MAC stage LUT 220.

Figure 10:
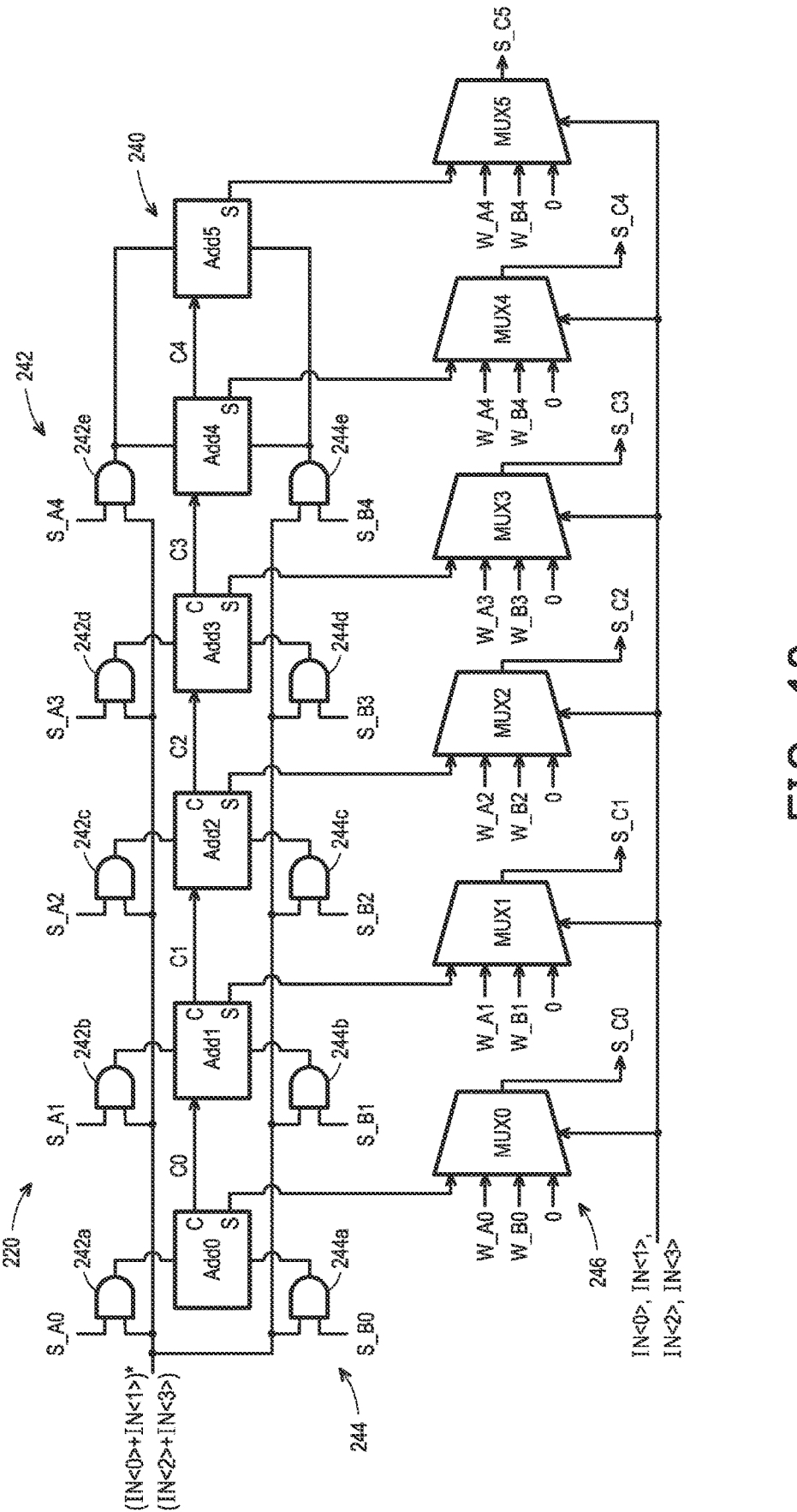
FIG. 10 is a schematic diagram illustrating an example second MAC stage LUT circuit in accordance with some embodiments.

FIG. 10 illustrates further aspects of an embodiment of the second MAC stage LUT 220 that includes an adder circuit 240. The adder circuit 240 shown in the example of FIG. 10 is a six bit adder including six adder circuits Add0, Add1, Add2, Add3, Add4 and Add5 (collectively adders or adder circuits 240). In the illustrated embodiment, the first adder Add0 is a half adder circuit, while the remaining adders Add1, Add2, Add3, Add4 and Add5 are full adder circuits. Note that the adder circuit 240 shown in FIG. 10 is a two's complement adder, and the sixth adder Add5 provides a sign extension. If only unsigned weight values are employed, the adder 240 could be replaced with a binary adder as discussed in conjunction with FIG. 6 above.

A first plurality of AND circuits 242a, 242b, 242c, 242d and 242d (collectively AND circuits 242) receive the sum outputs S_A0, S_A1, S_A2, S_A3, S_A4 at respective first input terminals, as well as the sum of the first and second input signals multiplied by the sum of the third and fourth input signals (IN<0>+IN<1>)*(IN<2>+IN<3>) at second input terminals.

A second plurality of AND circuits 244a, 244b, 244c, 244d and 244e (collectively AND circuits 244) receive the sum outputs S_B0, S_B1, S_B2, S_B3, S_B4 at respective first input terminals, as well as the sum of the first and second input signals multiplied by the sum of the third and fourth input signals (IN<0>+IN<1>)*(IN<2>+IN<3>) at second input terminals.

Thus, as shown in the truth table of FIG. 9, the outputs S_An, S_Bn of the first and first MAC stage second LUTs 110a, 110b are provided to the respective adders 242 if (IN<0>+IN<1>)*(IN<2>+IN<3>)=1. If either or both of (IN<0>+IN<1>) and (IN<2>+IN<3>) is 0, the corresponding first and second AND circuits 244, 244 output a predetermined value such as 0 to the respective adder 240.

The half adder circuit Add0 is configured to add the received first bits of the first and second sum outputs S_A0 and S_B0 and output the resulting sum to the first mux MUX0. The half adder circuit Add0 additionally outputs a first carry bit C0 based on the add operation. The full adder circuit Add1 is configured to add the second bits of the first and second sum outputs S_A1 and S_B1 as well as the first carry bit C0 output by the half adder Add0. The first full adder Add1 outputs the determined sum along with a second carry bit C1. The second full adder Add2 adds the third bits of the first and second sum outputs S_A2 and S_B2 and the second carry bit C1 output by the first full adder Add1. The second full adder Add2 outputs the sum and a third carry bit C2. The third full adder Add3 adds the fourth bits of the first and second sum outputs S_A3 and S_B3 and the third carry bit C2 output by the second full adder Add2. The fourth full adder Add4 adds the fourth bits of the first and second sum outputs S_A3 and S_B3 and the fourth carry bit C3 output by the third full adder Add3. The six bit adder shown in FIG. 10 is a two's compliment adder circuit that facilitates addition of negative weight values in embodiments that employ signed weight inputs. The S_C5 output of the fifth full adder Add5 provides the sign extension for the second MAC stage sum output S_Cn. In embodiments using only unsigned weights, a binary adder may be employed.

A plurality of MUXs 246 receive outputs of their respective ADD circuits 240. The example of FIG. 10 includes six MUXs MUX0, MUX1, MUX2, MUX3, MUX4, MUX5. MUX0, MUX1, MUX2, MUX3, MUX4 also receive the respective sum outputs S_An and S_Bn of the first and first MAC stage second LUTs 110a, 110b, and MUX5 receives the sum outputs S_A4 and S_A4. Each of the MUXs 246 further receive a predetermined data value such as 0. The select inputs of each of the MUXs 246 are connected to receive the sum of the first and second input signals (IN<0>+IN<1>) and the sum of the third and fourth inputs (IN<2>+IN<3>) output by the first and first MAC stage second LUTs 110a, 110b.

As shown in the truth table of FIG. 9, if both the sum of the first and second input signals (IN<0>+IN<1>) and the sum of the third and fourth inputs (IN<2>+IN<3>) is 0, the predetermined value (i.e. 0) is output by the MUXs 246. if either the sum of the first and second input signals (IN<0>+IN<1>) or the sum of the third and fourth inputs (IN<2>+IN<3>) is 1 (but not both), the sum output of the corresponding first MAC LUT 110a, 110b is output by the MUXs 246. If both the sum of the first and second input signals (IN<0>+IN<1>) and the sum of the third and fourth inputs (IN<2>+IN<3>) is 1, the output of the corresponding Adder 240 is output by the respective MUX246.

Thus, the adder circuit 240 is accessed for the second MAC stage LUTs 220 when both input signals are 1. For the three remaining states where at least one of the input signals is 0, the second MAC stage LUTs 220 output a static value input to the MUXs, thus reducing power used by the second MAC stage. In some embodiments with, for example, a 10% toggle rate, the second MAC stage LUTs 220 may reduce power consumption by 37%.

Figure 11:
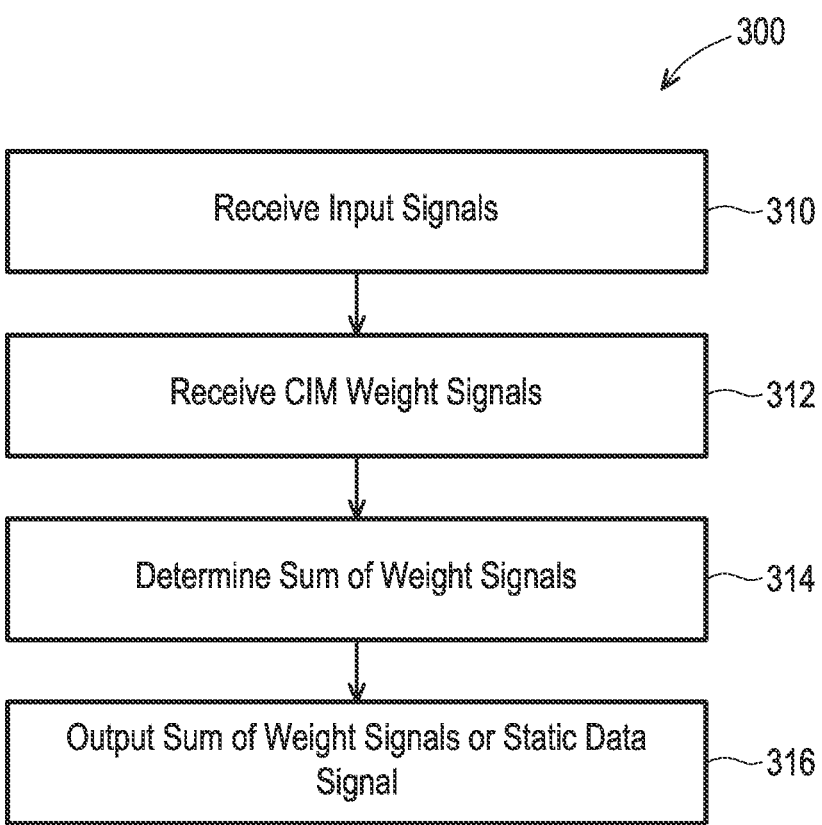
FIG. 11 is a flow diagram illustrating a method in accordance with disclosed embodiments.

FIG. 11 is a flow diagram illustrating an example of a MAC method in accordance with the present disclosure. Referring to FIG. 11 in conjunction with the LUT circuits disclosed above, the method 300 includes receiving a first input signal IN<0> and a second input signal IN<1> by a LUT such as the LUT 110 in an operation 310. At operation 312, first and second CIM weight signals W_An, W_Bn are received by the LUT 110. A sum of the first CIM weight and the second CIM weight signal is by an adder such as any of the adders 130, 140, 150 at operation 314. At operation 316, one of the sum of the first CIM weight signal W_An and the second CIM weight signal W_Bn or a static data signal (e.g. the first CIM weight signal W_An, the second CIM weight signal W_Bn, a predetermined signal such as logic 0, etc.) is output in response to the first and second weight signals.

Thus, the present disclosure provides a MAC system that includes LUTs for certain of the multiply and add functions, reducing dynamic power consumption for the MAC operations.

Disclosed embodiments include a MAC device for CIM that includes an input driver configured to provide a plurality of input signals including a first input signal and a second input signal. A lookup table (LUT) stores or accesses a plurality of CIM weight signals including a first CIM weight signal and a second CIM weight signal. The LUT is configured to receive the first input signal and the second input signal and provide a sum output based on the first and second input signals and the first and second CIM weight signals.

In accordance with further embodiments, a MAC device for CIM includes a first MAC stage having a first lookup table (LUT) and a first adder. The first MAC stage is configured to receive first and second CIM weight signals and to provide one of an output of the first adder or a first static data signal as a first MAC stage first sum output based on first and second input signals. The first MAC stage further includes a second LUT and a second adder and configured to receive third and fourth CIM weight signals. The first MAC stage is configured to provide one of an output of the second adder or a second static data signal as a first MAC stage second sum output based on third and fourth input signals. A second MAC stage has a LUT configured to receive the first MAC stage first and second sum outputs. The second MAC stage LUT includes a third adder and is configured to provide one of an output of the third adder or a third static data signal as a second MAC stage sum output based on first, second, third and fourth input signals.

In accordance with further aspects of the disclosure, a method includes receiving a first input signal and a second input signal by an LUT. A first and a second CIM weight signal are received by the LUT, and a sum of the first CIM weight and the second CIM weight signal are determined by an adder. One of the sum of the first CIM weight and the second CIM weight signal or a static data signal is output in response to the first and second weight signals.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A multiply-accumulate (MAC) device for compute-in-memory (CIM), comprising:

an input driver configured to provide a plurality of input signals including a first input signal, and a second input signal, a third input signal and a fourth input signal;

a first MAC stage first lookup table (LUT) storing a plurality of CIM weight signals including a first CIM weight signal and a second CIM weight signal, the first MAC stage first LUT configured to receive the first input signal and the second input signal and provide a first sum output based on the first and second input signals and the first and second CIM weight signals;

a first MAC stage second LUT storing the plurality of CIM weight signals including the first CIM weight signal and the second CIM weight signal, the first MAC stage second LUT configured to receive the third input signal and the fourth input signal and provide a second sum output based on the third and fourth input signals and the first and second CIM weight signals; and a second MAC stage including a second MAC stage LUT, the second MAC stage LUT connected to receive the first sum outputs of the first MAC stage first LUT and the second sum outputs of the first MAC stage second LUT.

2. The device of claim 1, wherein the plurality of input signals are determined according to a type of an application, and wherein the plurality of CIM weight signals are determined according to a training result or a configuration of a user.

3. The device of claim 1, wherein the LUT includes an adder configured to add the first CIM weight signal and the second CIM weight signal, wherein the LUT is configured to provide one of an output of the adder or a static data signal as the sum output based on the first and second input signals.

4. The device of claim 1, wherein the LUT includes an adder configured to add the first CIM weight signal and the second CIM weight signal, wherein the LUT is configured to:

provide an output of the adder as the sum output based on a first state of the first and second input signals;

provide the first CIM weight signal as the sum output based on a second state of the first and second input signals;

provide the second CIM weight signal as the sum output based on a third state of the first and second input signals; and provide a predetermined signal as the sum output based on a fourth state of the first and second input signals.

5. The device of claim 4, wherein the LUT further comprises:

a multiplexer (MUX) including:

a first input terminal connected to receive the output of the adder;

a second input terminal connected to receive the first CIM weight signal;

a third input terminal connected to receive the second CIM weight signal;

a fourth input terminal connected to receive the predetermined signal;

an output terminal configured to output the sum output;

wherein the MUX is configured to output one of the output of the adder, the first CIM weight signal, the second CIM weight signal, or the predetermined signal at the output terminal in response to the first input signal and the second input signal.

6. The device of claim 1, wherein the LUT is configured to store a first group of CIM weight signals including the first CIM weight signal and a second group of CIM weight signals including the second CIM weight signal, and wherein the LUT is configured to provide a plurality of sum outputs including the sum output based on the first and second input signals and the first and second groups of CIM weight signals.

7. The device of claim 6, wherein each of the plurality of first CIM weight signals is a corresponding bit of an n bit first CIM weight, where n is a positive integer, and wherein each of the plurality of second CIM weight signals is a corresponding bit of an n bit second CIM weight.

8. The device of claim 1, wherein:

the second MAC stage LUT includes a second MAC stage adder configured to add the first sum output by the first MAC stage first LUT and the second sum output by the first MAC stage second LUT;

the second MAC stage LUT is configured to provide an output of the second MAC stage adder or provide a static data signal as a second MAC stage sum output based on the first, second, third, and fourth input signals.

9. The device of claim 8, further comprising:

a second MAC stage MUX including:

a first input terminal connected to receive the output of the second MAC stage adder;

a second input terminal connected to receive the sum output by the first MAC stage first LUT adder;

a third input terminal connected to receive the sum output by the first MAC stage second LUT adder;

a fourth input terminal connected to receive the predetermined data signal;

an output terminal configured to provide the second MAC stage sum output;

a first select input configured to receive a sum of the first and second input signals; and a second select input configured to receive a sum of the third and fourth input signals.

10. A multiply-accumulate (MAC) device for compute-in-memory (CIM), comprising:

a first MAC stage including a first lookup table (LUT) and a first adder, and configured to receive first and second CIM weight signals and to provide one of an output of the first adder or a first static data signal as a first MAC stage first sum output based on first and second input signals;

the first MAC stage including a second LUT and a second adder and configured to receive third and fourth CIM weight signals, the first MAC stage second LUT configured to provide one of an output of the second adder or a second static data signal as a first MAC stage second sum output based on third and fourth input signals; and a second MAC stage including a LUT configured to receive the first MAC stage first and second sum outputs, the second MAC stage LUT including a third adder and configured to provide one of an output of the third adder or a third static data signal as a second MAC stage sum output based on first, second, third and fourth input signals.

11. The device of claim 10, wherein the first static data signal includes one of the first CIM weight signal, the second CIM weight signal and 0, and wherein the second static data signal includes one of the third input signal, the fourth input signal and 0.

12. The device of claim 11, wherein the first MAC stage includes:

a first MAC stage first multiplexer (MUX) including:
　a first input terminal connected to receive the output of the first adder;
　a second input terminal connected to receive the first CIM weight signal;
　a third input terminal connected to receive the second CIM weight signal;
　a fourth input terminal connected to receive the 0;
　an output terminal configured to output the first MAC stage first sum output;
　wherein the first MAC stage first MUX is configured to output one of the output of the first adder, the first CIM weight signal, the second CIM weight signal, or the 0 at the output terminal in response to the first input signal and the second input signal; and a first MAC stage second MUX including:
　a first input terminal connected to receive the output of the second adder;
　a second input terminal connected to receive the third CIM weight signal;
　a third input terminal connected to receive the fourth CIM weight signal;
　a fourth input terminal connected to receive the 0;
　an output terminal configured to output the first MAC stage second sum output;
　wherein the first MAC stage second MUX is configured to output one of the output of the second adder, the third CIM weight signal, the fourth CIM weight signal, or the 0 at the output terminal in response to the third input signal and the fourth input signal.

13. The device of claim 10, wherein the third static data signal includes one of the first MAC stage first sum output, the first MAC stage second sum output and 0.

14. The device of claim 13, wherein the second MAC stage includes:

a second MAC stage MUX including:
　a first input terminal connected to receive the output of the third adder;
　a second input terminal connected to receive the first MAC stage first sum output;
　a third input terminal connected to receive the first MAC stage second sum output;

a fourth input terminal connected to receive the 0;
　an output terminal configured to output the second MAC stage sum output;
　wherein the second MAC stage MUX is configured to output one of the output of the third adder, the first MAC stage first sum output, the first MAC stage second sum output, or the 0 at the output terminal in response to the sum of the first input signal and the second input signal and the sum of the third input signal and the fourth input signal.

15. A method, comprising:
receiving a first input signal by a lookup table (LUT);
receiving a second input signal by the LUT;
receiving a first CIM weight signal by the LUT;
receiving a second CIM weight signal by the LUT;
determining a sum of the first CIM weight signal and the second CIM weight signal by an adder;
outputting one of the sum of the first CIM weight signal and the second CIM weight signal or a static data signal in response to the first and second weight signals.

16. The method of claim 15, wherein outputting the static data signal includes outputting one of the first CIM weight signal, the second CIM weight signal, and a predetermined signal.

17. The method of claim 16, wherein the first and second input signals are received by a multiplexer (MUX) connected to an output of the adder, and wherein the MUX is configured to output one of the output of the adder, the first CIM weight signal, the second CIM weight signal, or the predetermined signal in response to the first and second input signals.

18. The method of claim 17, further comprising:
determining the first and second input signals according to a type of an application; and
determining the first and second CIM weight signals according to a training result or a configuration of a user.

19. The method of claim 16, further comprising:
outputting the sum of the first CIM weight signal and the second CIM weight signal in response to a first state of the first and second input signals;
outputting the first CIM weight signal in response to a second state of the first and second input signals;
outputting the second CIM weight signal in response to a third state of the first and second input signals; and
outputting the predetermined signal in response to a fourth state of the first and second input signals.

20. The method of claim 15, wherein the one of the sum of the first CIM weight signal and the second CIM weight signal or the static data signal are output by a multiplexer (MUX).

* * * * *